United States Patent
Lim et al.

(10) Patent No.: US 7,302,517 B2
(45) Date of Patent: Nov. 27, 2007

(54) APPARATUS AND METHOD FOR CONTROLLING EXECUTE-IN-PLACE (XIP) IN SERIAL FLASH MEMORY, AND FLASH MEMORY CHIP USING THE SAME

(75) Inventors: Jaemin Lim, Anyang (KR); Chanik Park, Seoul (KR); Jaeyu Seo, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 215 days.

(21) Appl. No.: 10/694,832

(22) Filed: Oct. 29, 2003

(65) Prior Publication Data

US 2004/0230738 A1    Nov. 18, 2004

(30) Foreign Application Priority Data

Jan. 9, 2003   (KR) ............... 10-2003-0001449

(51) Int. Cl.
    *G06F 12/00* (2006.01)
(52) U.S. Cl. ............... 711/103; 711/209; 713/1
(58) Field of Classification Search ........... 711/103, 711/170, 209; 713/2, 1
    See application file for complete search history.

(56) References Cited

U.S. PATENT DOCUMENTS

| | | | |
|---|---|---|---|
| 6,574,747 B2* | 6/2003 | Ginsberg | 714/8 |
| 6,601,167 B1* | 7/2003 | Gibson et al. | 713/2 |
| 6,948,099 B1* | 9/2005 | Tallam | 714/38 |
| 7,058,779 B1* | 6/2006 | McClain | 711/170 |
| 2002/0069342 A1* | 6/2002 | Ginsberg | 711/209 |
| 2003/0206442 A1* | 11/2003 | Tang et al. | 365/185.17 |
| 2005/0080986 A1* | 4/2005 | Park | 711/103 |
| 2005/0132179 A1* | 6/2005 | Glaum et al. | 713/1 |

FOREIGN PATENT DOCUMENTS

| | | |
|---|---|---|
| JP | 6-4399 A | 1/1994 |
| JP | 7-114500 A | 5/1995 |
| JP | 7-146820 A | 6/1995 |
| JP | 2000-100181 A | 4/2000 |
| JP | 2000-306389 A | 11/2000 |
| JP | 2001-510612 A | 7/2001 |

OTHER PUBLICATIONS

M-Systems, "One Chip That Does It All", Dec. 2001, Home Toys, pp. 1-6.*
Steven Wells et al., "Flash Solid-State Drive with 6MB/s Read/Write Channel and Data Compression," Flash Memory: vol. II, Intel Corporation, pp. 10-1 through 10-2 (1993).*
"Section—6 Execute in Place (XIP)," PC Card Standard, Release 2.0, Personal Computer Memory Card International Association, pp. 6-1 through 6-38 (Sep. 1991).*

* cited by examiner

*Primary Examiner*—Pierre-Michel Bataille
(74) *Attorney, Agent, or Firm*—Sughrue Mion Pllc.

(57) ABSTRACT

The invention is for controlling execute-in-place in a serial flash memory and a flash memory chip using the same, enabling a serial flash controller with predetermined amount of storage to access the serial flash, to read an entire page to which required data belong, and to transmit the desired data to a main control unit or to execute the data. The apparatus includes a cache module for accessing a designated memory address of the serial flash in response to a command received from a main control unit, and reading or writing data required by the main control unit; a serial flash controller with a boot loader for allowing system booting to be performed by reading boot codes written on the serial flash, and storing the boot codes in a buffer and immediately transmitting the boot codes to the main control unit when the main control unit requires the boot codes.

9 Claims, 12 Drawing Sheets

APPARATUS AND METHOD FOR CONTROLLING EXECUTE-IN-PLACE (XIP) IN SERIAL FLASH MEMORY, AND FLASH MEMORY CHIP USING THE SAME

This application claims the priority of Korean Patent Application No. 10-2003-0001449 filed Jan. 9, 2003, in the Korean Intellectual Property Office, the disclosure of which is incorporated herein in its entirety by reference.

BACKGROUND OF THE INVENTION

1. Field of Invention

The present invention relates to an apparatus and method for controlling execute-in-place (hereinafter, referred to as "XIP") in a serial flash memory and a flash memory chip using the same, and more particularly, to an apparatus and method for controlling XIP in a serial flash memory and a flash memory chip using the same, wherein required data are retrieved or executed by accessing the serial flash memory through a hardware controller with a predetermined amount of storage capacity.

2. Description of the Related Art

In general, a flash memory is a writable memory that has non-volatility allowing recorded contents to be preserved even if power is not supplied thereto, like a ROM (Read Only Memory). The flash memory is largely classified into a parallel flash memory (hereinafter, referred to as "parallel flash") in which cells are arranged in parallel between bit lines and a ground line, and a serial flash memory (hereinafter, referred to as "serial flash") in which the cells are arranged in series therebetween, according to the fabrication method of the flash memory.

The parallel flash typically includes an EEPROM (Electrically Erasable Programmable Read Only Memory), a NOR type flash, and a DINOR (Divided Bit-line NOR) type flash that is a variant of the NOR type flash. The parallel flash is a device that allows addresses to be accessed based on byte unit in such a manner that read and write operations can be performed with respect to an arbitrary address irrespective of the order of the cells (random access).

However, since the parallel flash requires contact electrodes of the bit lines for the respective cells, there is a disadvantage in that the area of each cell increases as compared with the serial flash.

The serial flash typically includes a NAND and an AND. The serial flash is a block device that allows addresses to be accessed based on block unit in such a manner that a relevant block is first selected and respective cells connected in series to one another are then read.

A block in the serial flash means a unit capable of being deleted with one delete operation, and a page means a data size capable of being read or written during read/write operations.

Since such a serial flash has advantages of higher write speed, relatively lower cost, and facilitation of increase in its capacity as compared with the parallel flash, it has been widely used for storing large volumes of data. However, since it does not allow access based on byte unit, it cannot provide the XIP function by which recorded data are directly executed without transferring them to a main memory.

Therefore, the serial flash is generally used as an auxiliary data storage device, and boot codes for system booting are stored in a ROM or the serial flash is divided to manage the boot codes and data.

Alternatively, the serial flash is generally used as an auxiliary data storage device, and the boot codes for system booting are stored in a XIP-enabled NOR flash memory, or a ROM.

FIG. 1a shows a system booting process using the conventional NOR flash memory, and FIG. 1b shows a system booting process using the serial flash.

As shown in FIG. 1a, since access based on byte unit can be performed in the NOR flash memory, the system booting is performed in such a manner that a main control unit of a system directly reads operating system (OS) boot codes including OS images and data for system booting from the NOR flash memory.

As shown in FIG. 1b, since the access based on byte unit cannot be performed in the serial flash memory contrary to the NOR flash memory or ROM, the data for system booting are read from a boot loader of a boot ROM (1); and an entire page to which the OS boot codes including the OS images required for the system booting belong is read from the serial flash and then copied to the main memory, and the OS images are then read and transmitted to the main control unit (2).

That is, in order to provide the OS images for system booting that are required by the main control unit, the entire page to which the OS boot codes belong is read from the serial flash and written in the main memory, and only the OS images are read from the main memory and transmitted to the main control unit. Thus, the main control unit can perform the system booting (OS loading) (3).

In such a way, since the serial flash does not support the XIP function contrary to the NOR flash memory, which is the parallel flash, or the ROM, in order to execute the OS boot codes required for system booting, the OS boot codes should be transferred to the main memory to be executed therein. Thus, there are problems in that execution time is delayed and the available amount of storage capacity in the main memory is reduced due to the boot codes transferred to the main memory.

In particular, since the size of the operating system recently tends to be larger due to the variety of application programs and additional functions (e.g., 16 to 32 MB in case of WinCE), there is a problem in that the efficiency of memory is deteriorated since the amount of storage capacity occupied by the boot codes read from the serial flash becomes larger in the main memory.

Therefore, there is a current need for a serial flash which can store programs by using a larger amount of memory capacity at a lower or same cost and support the XIP function so as to directly execute data on the flash memory, if necessary.

SUMMARY

An object of the present invention is to enable the XIP function to be supported by a serial flash in such a manner that a serial flash controller with a predetermined amount of storage capacity accesses the serial flash, reads an entire page to which required data belong, and transmits the desired data to a main control unit or executes the data.

Further, another object of the present invention is to provide a serial flash controller and a serial flash, which can support the XIP function, in the form of a flash memory chip and to enable a conventional ROM to be replaced with the flash memory chip.

An apparatus for controlling XIP in a serial flash according to the present invention comprises a cache module for accessing a designated memory address of the serial flash in response to a command received from a main control unit through a system interface unit, and reading or writing data required by the main control unit; a serial flash controller with a boot loader for allowing system booting to be performed by reading boot codes written on the serial flash, storing the boot codes in a buffer and immediately transmitting the boot codes to the main control unit when the main control unit requires the boot codes; and a flash interface unit for handling transmission/reception of data among the cache module, the serial flash controller and the serial flash.

A method for controlling XIP in a serial flash according to the present invention comprises comprising the steps of accessing the serial flash, reading boot codes for initial booting, and storing them in a buffer, when power is supplied to a system; and if the boot codes are completely stored and the boot codes are required by a main control unit of the system, reading the boot codes from the buffer, transmitting them to the main control unit and processing an operation required by the main control unit.

A flash memory chip using the apparatus for controlling the XIP in the serial flash according to the present invention comprises a serial-cell type serial flash; and a controller for accessing the serial flash, and directly providing boot codes for system booting which are stored beforehand in a buffer, or reading or writing relevant data by accessing a designated memory address, in response to an operation required by a main control unit of a system.

BRIEF DESCRIPTION OF THE DRAWINGS

The above and other objects and features of the present invention will become apparent from the following description of an exemplary embodiment given in conjunction with the accompanying drawings, in which.

DESCRIPTION

Embodiments of an apparatus and method for controlling XIP in a serial flash, and a flash memory chip using the same according to the present invention will be first described in detail with reference to the accompanying drawings.

Figure 1A:
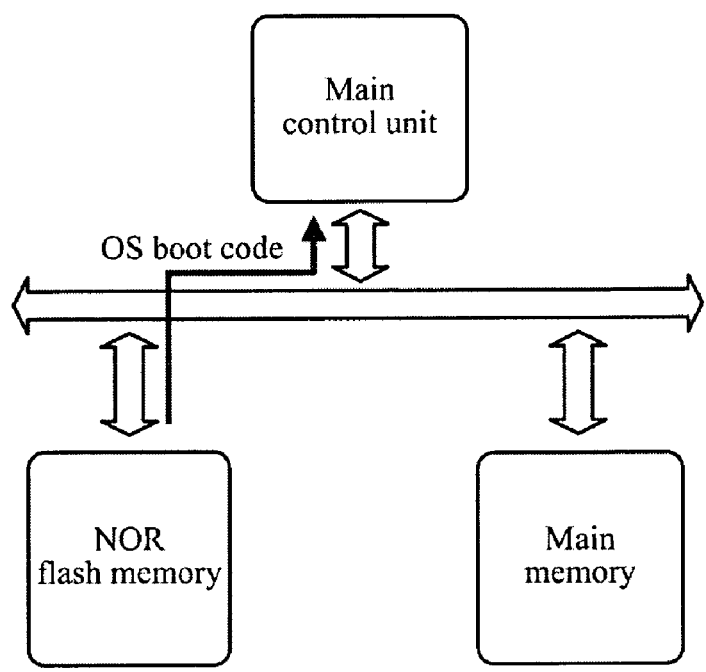
FIGS. 1a and 1b show processes of executing XIP by using a conventional NOR flash memory and a conventional serial flash, respectively.
Figure 1B:
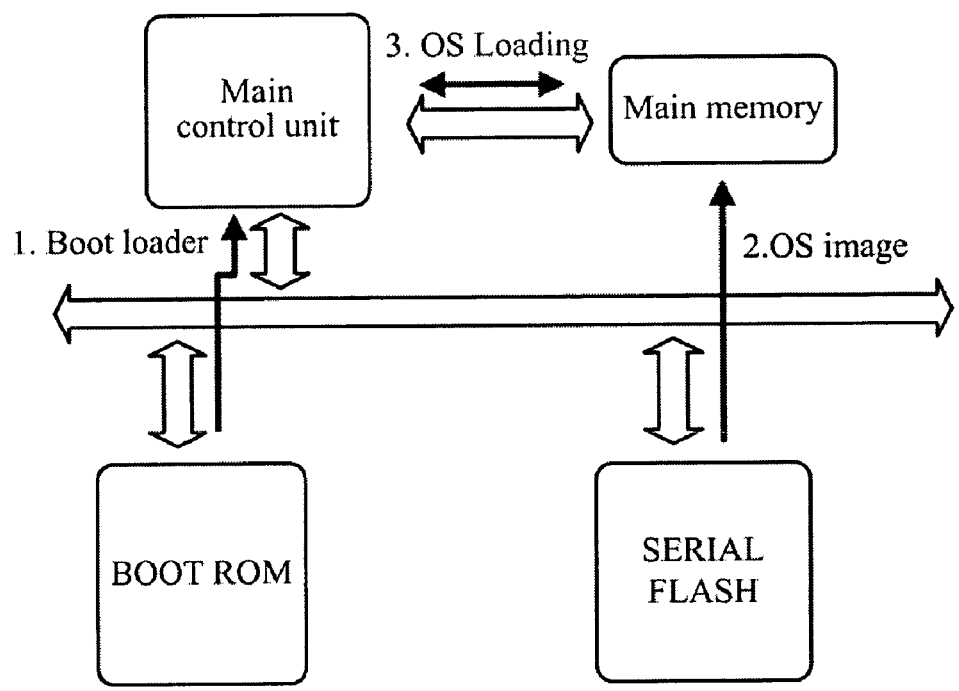
Figure 2:
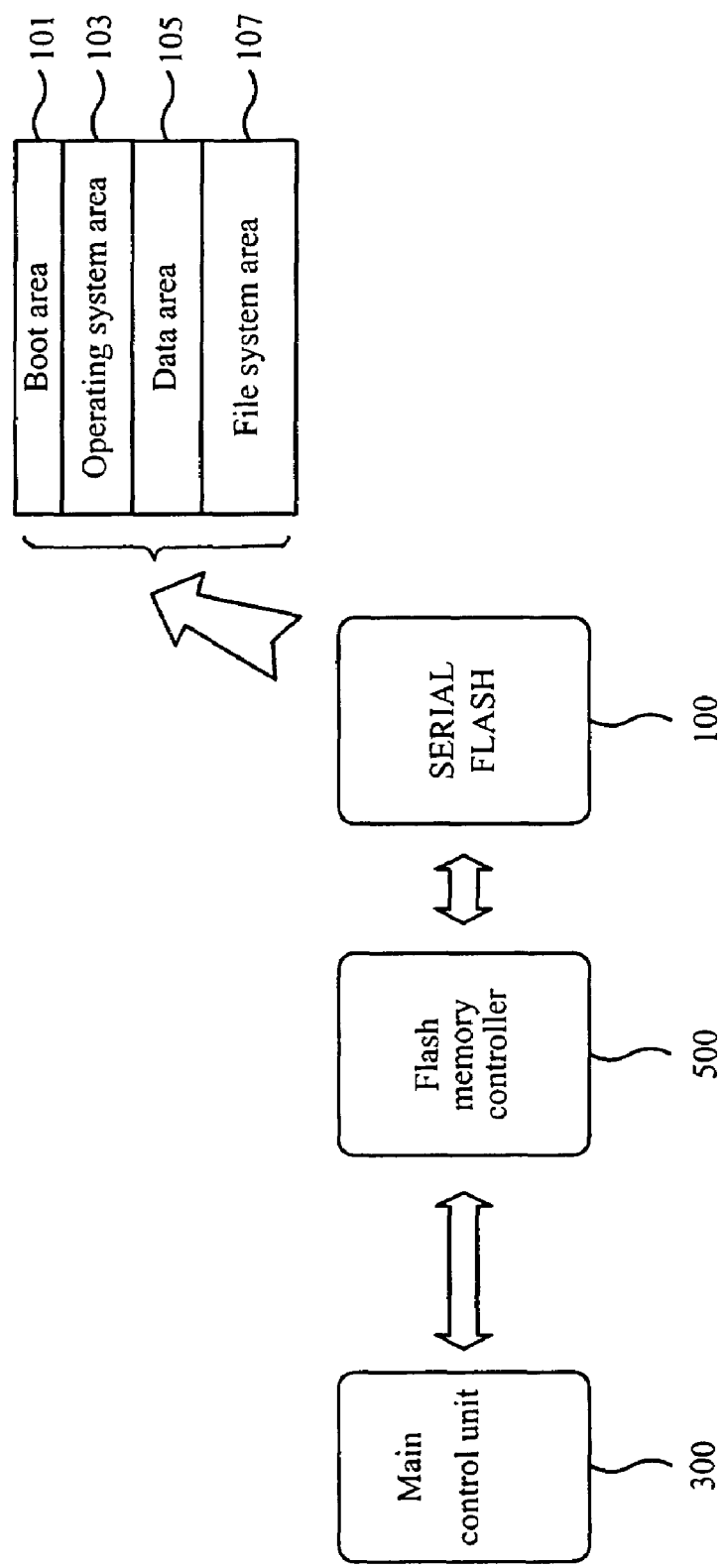
FIG. 2 is a block diagram schematically showing configurations of a serial flash and a flash memory access apparatus according to the present invention.

FIG. 2 shows the apparatus for controlling the XIP in the serial flash and a serial flash access apparatus therefor according to the present invention.

As shown in FIG. 2, the serial flash access apparatus comprises the serial flash 100, a main control unit 300 of a system for generating control commands for reading/writing data from/to the serial flash 100, and a control apparatus 500 (hereinafter, referred to as "controller") for performing relevant operation control by accessing the serial flash in response to the control commands generated from the main control unit 300.

The serial flash 100 is a cell type serial flash memory. For example, a NAND flash that is a kind of serial flash having 528 bytes consists of a data block of 512 bytes and a spare block of 16 bytes.

As separately shown in FIG. 2, the data block of the serial flash comprises a boot area (100 KB) 101 on which boot codes for initially booting an operating system (OS) are recorded, an operating system area (20 MB) 103 on which the operating system and application programs are recorded, a data area (20 MB) 105 on which data for executing the programs written on the operating system area 103 are recorded, and a file system area (24 MB) 107 on which signals generated during operations of the operating system and data input by a user are recorded.

Figure 3:
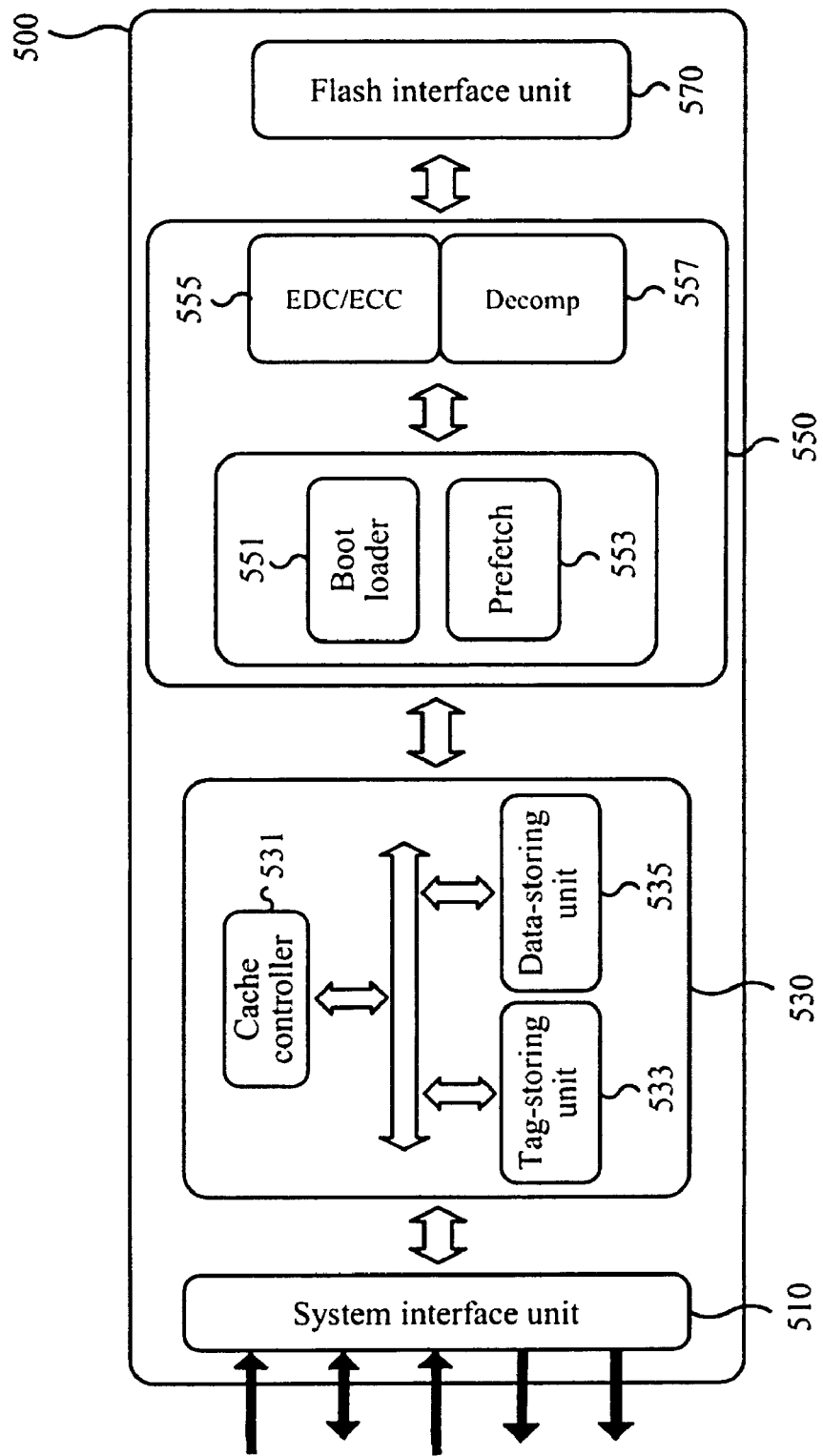
FIG. 3 is a block diagram schematically showing a configuration of an apparatus for controlling XIP in the serial flash according to the present invention.

FIG. 3 is a block diagram schematically showing the configuration of the controller 500 for controlling the XIP in the serial flash 100 of the present invention in the serial flash access apparatus.

As shown in FIG. 3, the controller 500 mainly comprises a system interface unit 510 for transmitting and receiving signals to/from the main control unit 300; a cache module 530 (hereinafter, referred to as "cache") for accessing memory addresses of the serial flash 100 designated in response to commands from the main control unit 300 received through the system interface unit 510 and reading or writing data required by the main control unit 300; a serial flash controller 550 allowing system booting to be performed by reading the boot codes recorded in the serial flash 100, storing the boot codes in a buffer and immediately transmitting them when the main control unit 300 requests the boot codes; a flash interface unit 570 for handling transmission/reception of data between the cache 530 or the serial flash controller 550 and the serial flash 100; and a buffer (not shown) for temporarily storing data read from the serial flash 100 during the process of accessing the serial flash.

The cache 530 of the controller 500 constructed as such is provided for allowing the main control unit 300 to more rapidly access the data of the serial flash 100, and comprises an L2-cache that is a secondary or Level Two cache memory.

As shown in FIG. 3, the cache 530 comprises a cache controller 531, a tag-storing unit 533, and a data-storing unit 535.

The cache controller 531 allows the serial flash 100 to be efficiently accessed by referring to the tag-storing unit 533 and the data-storing unit 535 in response to read or write commands required by the main control unit 300.

That is, if a write command for a specific memory address is received from the main control unit 300, the cache controller 531 accesses a relevant address of the serial flash 100 and writes data which are required to be recorded; and if a read command is received, it determines through the tag-storing unit 533 whether data that are required to be read are stored in the data-storing unit 535.

The cache controller 531 reads the relevant data from the data-storing unit 535 in accordance with the determination result and transmits them to the main control unit 300; or accesses the serial flash 100, reads the entire page to which the relevant data belong, stores it in the buffer and transmits the required data to the main control unit 300. Further, the cache controller writes the read page and its storage information on the tag-storing unit 533 and the data-storing unit 535.

The storage information on the data read from the serial flash 100 by the cache controller 531 (e.g., the memory address of the read page in the serial flash, the stored address of the read page) is recorded in the tag-storing unit 533 that comprises the Static Random Access Memory (SRAM).

The data read from the serial flash 100 in response to the operation control of the cache controller 531 are recorded in the data-storing unit 535 that comprises the SRAM.

Figure 4:
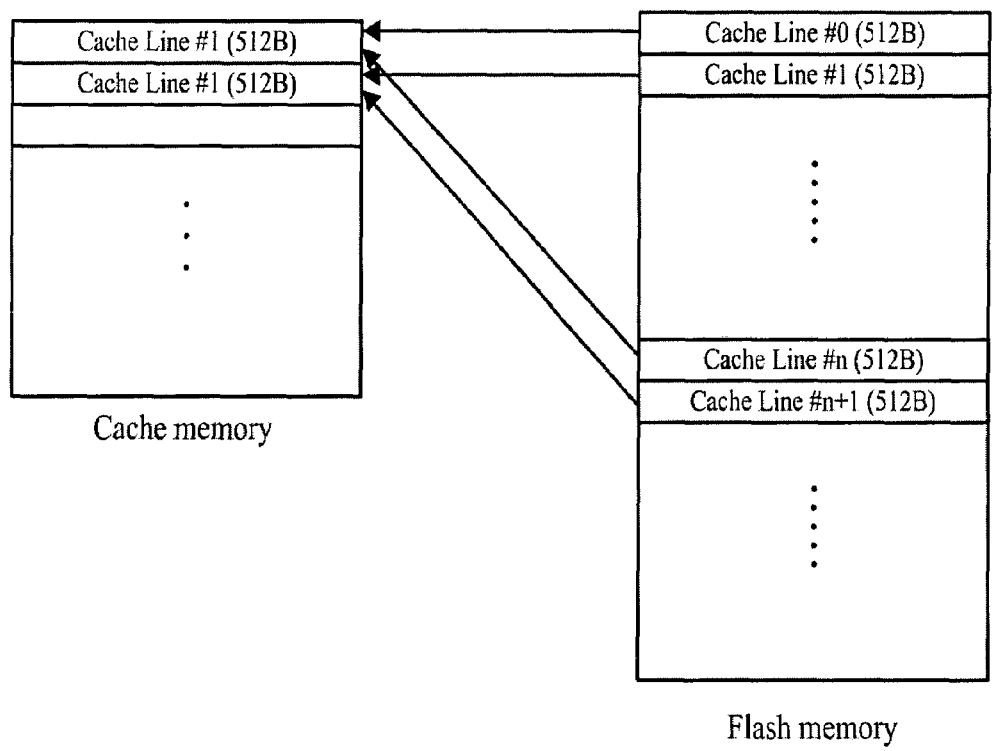
FIG. 4 shows schematically a configuration of a data-storing unit in FIG. 3.

In FIG. 4, a configuration of a data-storing unit 535 is shown. The data-storing unit 535 consists of an address map of the serial flash 100 on which the page read from the serial flash 100 by the cache controller 531 is recorded, and the cache controller 531 accesses the serial flash 100 through the data-storing unit 535 and provides the data required by the main control unit 300.

With the use of the cache 530, access time to the serial flash 100 can be reduced and it is possible to freely access the serial flash for the operations of reading and writing the data in the main control unit 300.

That is, in case of data written in the same page, the time required for accessing the data recorded in the serial flash 100 generally becomes a predetermined access time (e.g., about 50 ns). However, in case of data written in different pages, the time becomes about 10 μs, which is relatively long. The page accessed through the cache 530 and its storage information are written on the tag-storing unit 533 and the data-storing unit 535, so that when data on the same page are required by the main control unit 300, the required data can be provided through the data-storing unit 535 without directly accessing the serial flash 100. Thus, the data that have been accessed once can be utilized efficiently and access time can be reduced.

In addition, the serial flash controller 550 of the controller 500 comprises a boot loader 551, a prefetch 553, an error detection code/error correction code (hereinafter, referred to as "EDC/ECC") 555, and a decomp 557.

The boot loader 551 is to efficiently execute system booting. If power is supplied, the boot loader 551 causes the booting to start by reading the operating system recorded on the boot area 101 of the serial flash 100 and initialize codes such as images for the system booting, storing them in the buffer, and transmitting the stored initialize codes to the main control unit 300 if the main control unit 300 initiates a first code fetch cycle and requests the reading of the boot codes. The prefetch 553, the EDC/ECC 555, and the decomp 557 are to improve the performance of the controller 500. The prefetch 553 reads beforehand data which are expected to be read by the main control unit 300, and stores the data in the buffer; the ECC/EDC 555 detects and corrects errors of transmitted and received data; and the decomp 557 processes data compression and decompression required in accordance with system characteristics.

The decomp 557 is provided in accordance with the system characteristics but may not be provided if necessary.

The system booting can be efficiently executed in such a manner that the main control unit 300 reads the data required for the booting from the serial flash 100 through the serial flash controller 550 upon the initial booting of the system.

For reference, in the controller 500 according to the embodiment of the present invention, all modules may be implemented with hardware or software, or some of them may be implemented with software.

Therefore, it will be apparent that implementing the controller for the XIP in the serial flash with the hardware or software according to the embodiment of the present invention does not depart from the scope of the invention, and changes and modifications may be made in accordance with the implementation of the controller with the software and/or hardware without departing from the scope of the invention.

With the use of the controller 500 for the XIP in the serial flash 100 constructed as such, a serial flash chip capable of supporting the XIP is obtained by constructing the controller 500 and the serial flash 100 as one chip.

The user can substitute a ROM or NOR flash memory with the serial flash 100 by using the serial flash chip.

Figure 5:
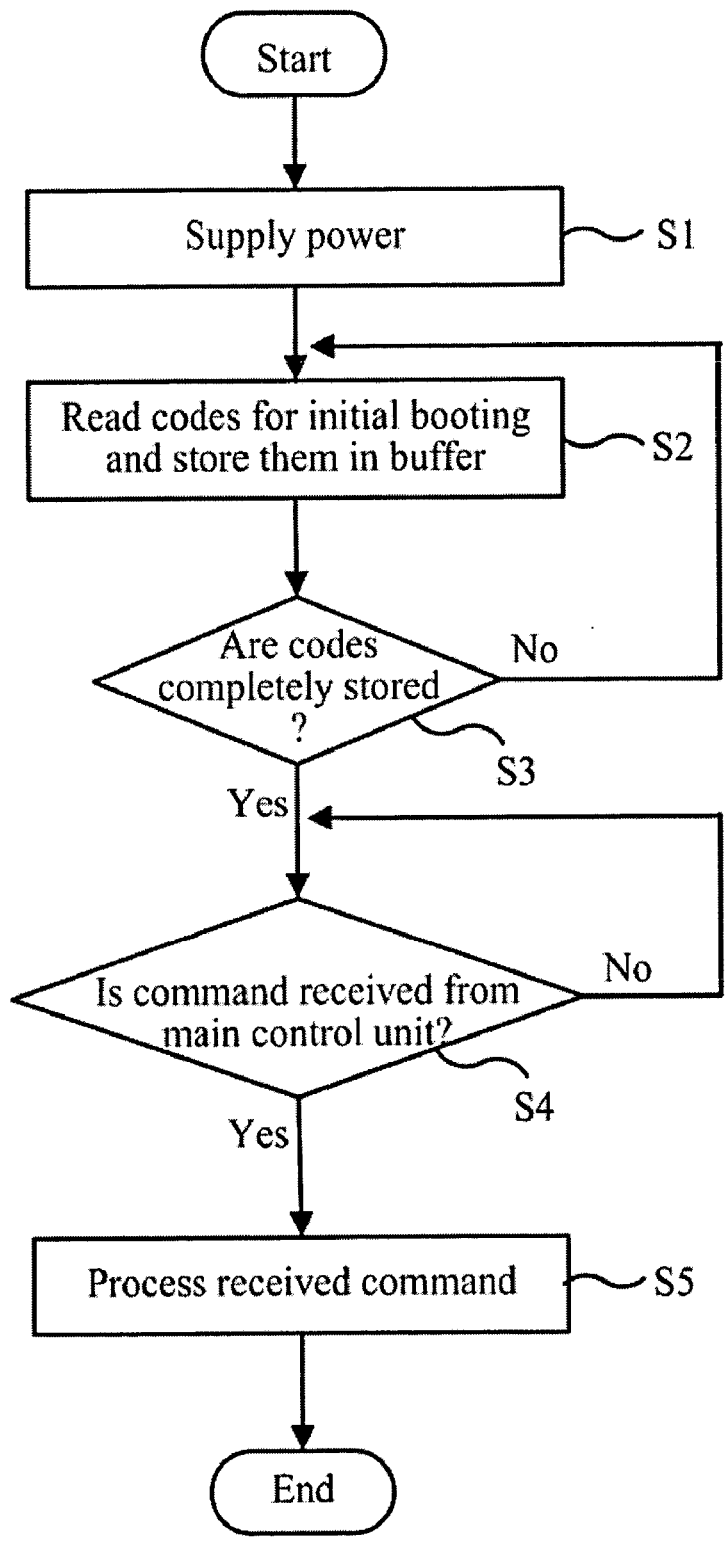
FIG. 5 is an operational flowchart schematically illustrating a processing procedure of a method for controlling the XIP in the serial flash according to the present invention.

An XIP method in the serial flash 100 through the controller 500 for the XIP in the serial flash 100 constructed as such will be performed as shown in FIG. 5.

When power is first supplied to the system (S1), the boot loader 551 of the controller 500 accesses the boot area 101 of the serial flash 100, sequentially reads the boot codes for the initial booting, and stores them in the buffer (S2).

Then, the controller 500 determines whether the codes read by the boot loader 551 are completely stored in the buffer (S3). If it is determined that the storage of the codes is not completed, the codes that are being read are continuously stored in the buffer. If it is determined that the storage is completed, in order to process a command (e.g., read or write operation control signal for data stored in a specific address) requested by the main control unit 300, the controller 500 determines whether the command is received through the system interface module 510 (S4).

If it is determined that there is no command received from the main control unit 300, the procedure returns to the routine of determining whether a command is received or not. If it is determined that there is a command, command processing is made through the operation control corresponding to the received command (S5).

In the XIP method in the serial flash 100 performed in such operation processes, an operation process for the command received from the main control unit 300 will be described in detail with reference to the accompanying drawings.

Figure 6:
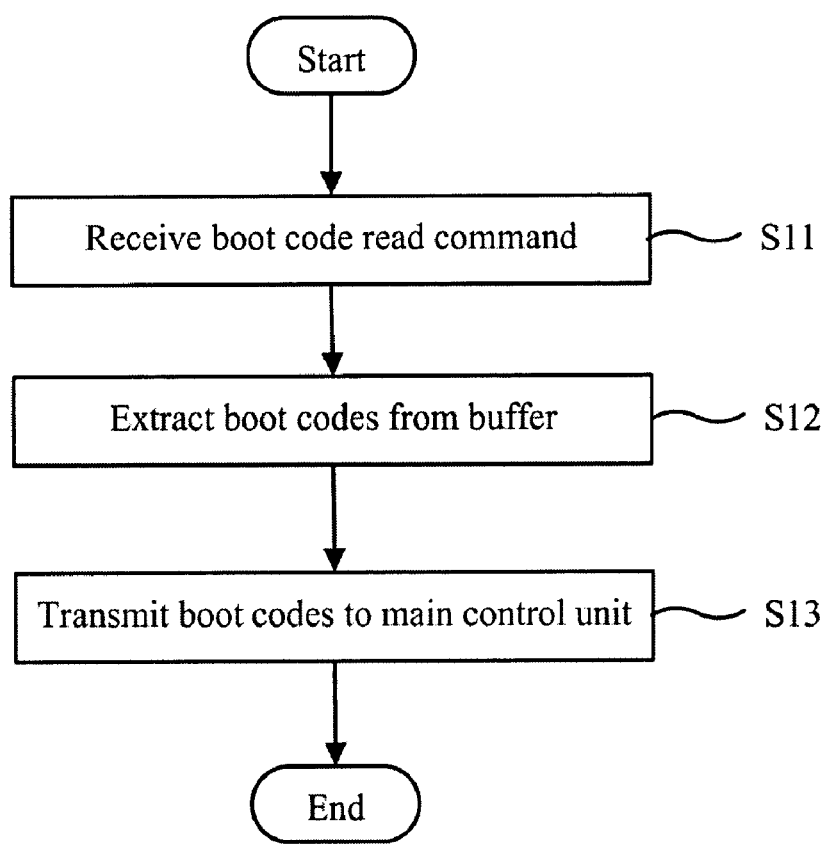
FIG. 6 is an operational flowchart illustrating a processing procedure for a boot read command received from a main control unit in step S5 of FIG. 5.

FIG. 6 shows a processing procedure for a case where a boot read command for causing the booting code data required for system booting to be read is received from the main control unit 300 in accordance with the first code fetch cycle.

As shown in FIG. 6, after the main control unit 300 is reset, if the boot read command is received from the main control unit 300 while initiating the first code fetch cycle (S11), the controller 500 reads the booting codes, which were read from the serial flash 100 and then stored in the buffer (S12), and transmits the read boot codes to the main control unit 300 (S13).

Figure 7:
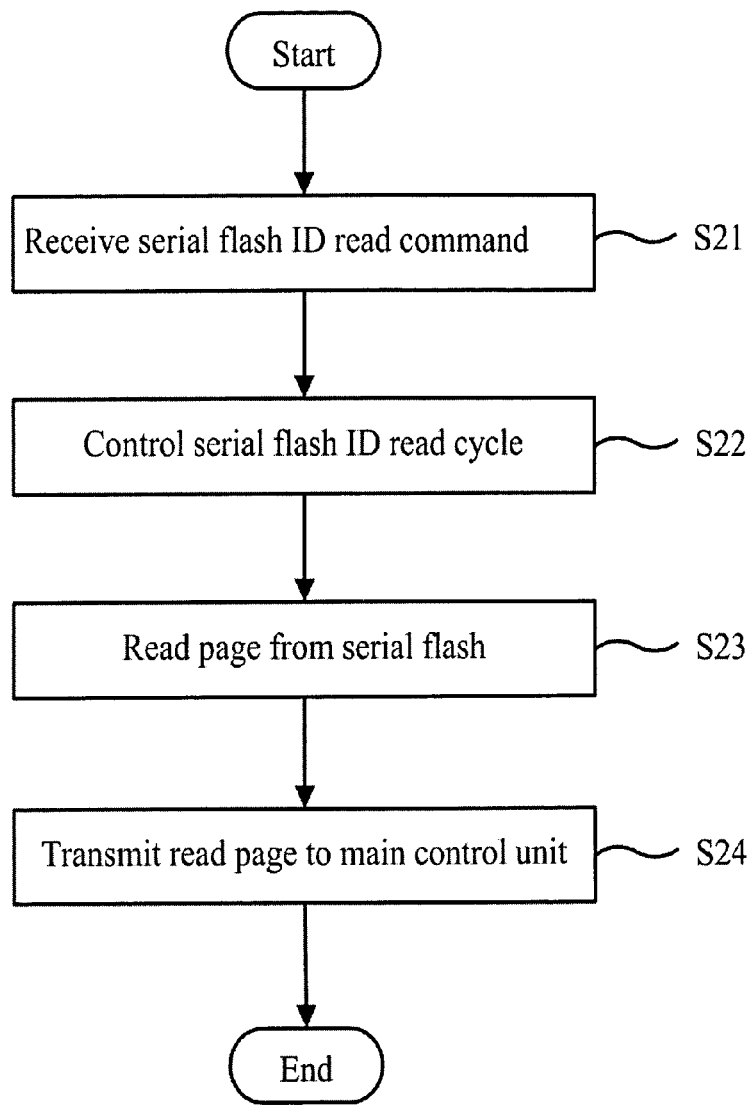
FIG. 7 is an operational flowchart illustrating a processing procedure for a serial ID read command received from the main control unit in step S5 of FIG. 5.

FIG. 7 shows a processing procedure for a case where a serial flash ID read command for causing a serial flash ID recorded on the serial flash 100 and information on devices used in the system to be read is received from the main control unit 300.

As shown in FIG. 7, if the serial flash ID read command is received from the main control unit 300 (S21), the controller 500 performs a control operation for reading the serial flash ID to provide serial flash ID data required by the main control unit 300 through the cache controller 531 of the cache 530 (S22).

The control operation for reading the serial flash ID is performed by accessing the serial flash 100, reading a page to which the serial flash ID data required by the main control unit 300 belong, and storing the read page in the buffer.

The serial flash ID data required by the main control unit 300 are extracted from the page that has been read and stored in the buffer in accordance with the control operation for reading the serial flash ID (S23), and the extracted serial flash ID data are transmitted to the main control unit 300 (S24).

Figure 8:
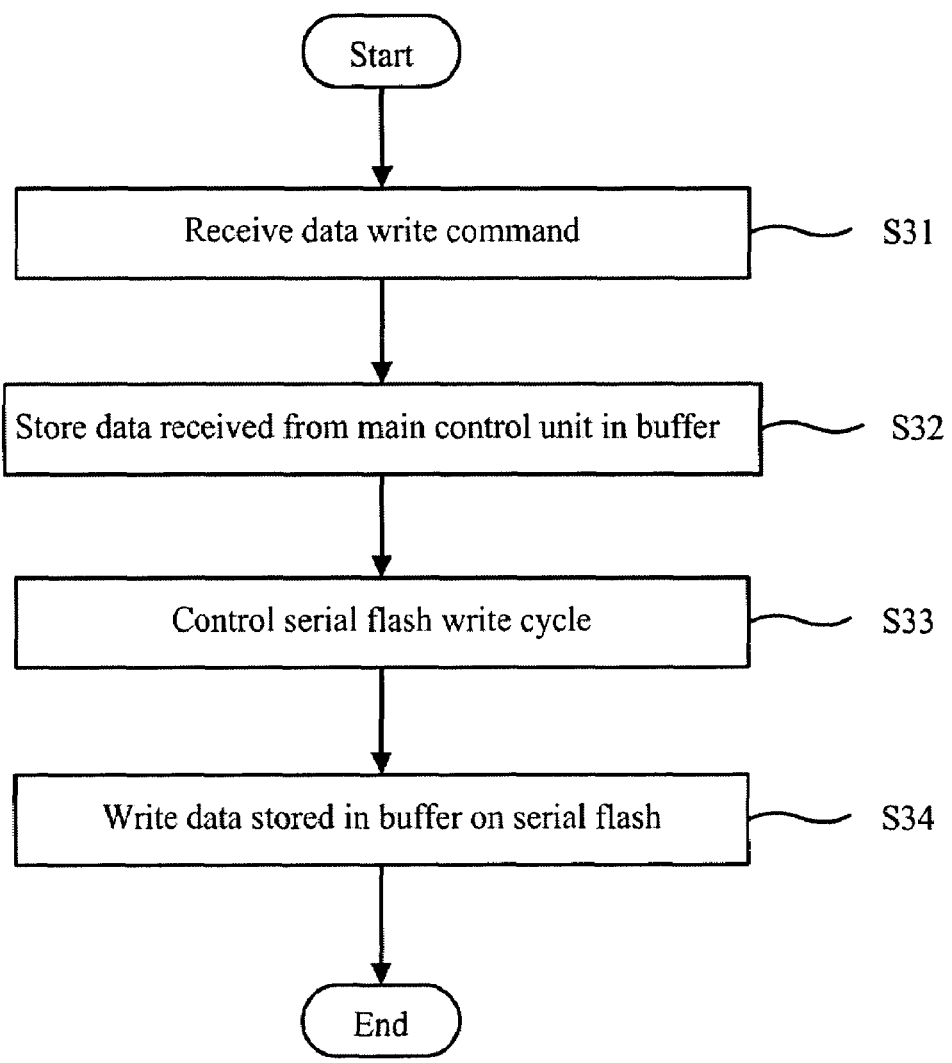
FIG. 8 is an operational flowchart illustrating a processing procedure for a write command received from the main control unit in step S5 of FIG. 5.

FIG. 8 shows a processing procedure for a case where a write command for causing predetermined data to be recorded on the serial flash 100 is received from the main control unit 300.

As shown in FIG. 8, if the write command is received from the main control unit 300 together with a predetermined logic address, the controller 500 receives the data transmitted from the main control unit 300 and stores them in the buffer (S32).

When the data is completely received, a control operation for a serial flash write cycle, which determines a memory address on which the data will be written through a physical address of the serial flash 100 assigned by means of mapping and writes information about the mapping between the logic address and the physical address changed in response to the write operation on a mapping table, is performed (S33).

If the address in which the data will be stored is determined through the cycle control operation, the data stored in the buffer are read and then written at a designated physical address of the serial flash (S34).

Figure 9:
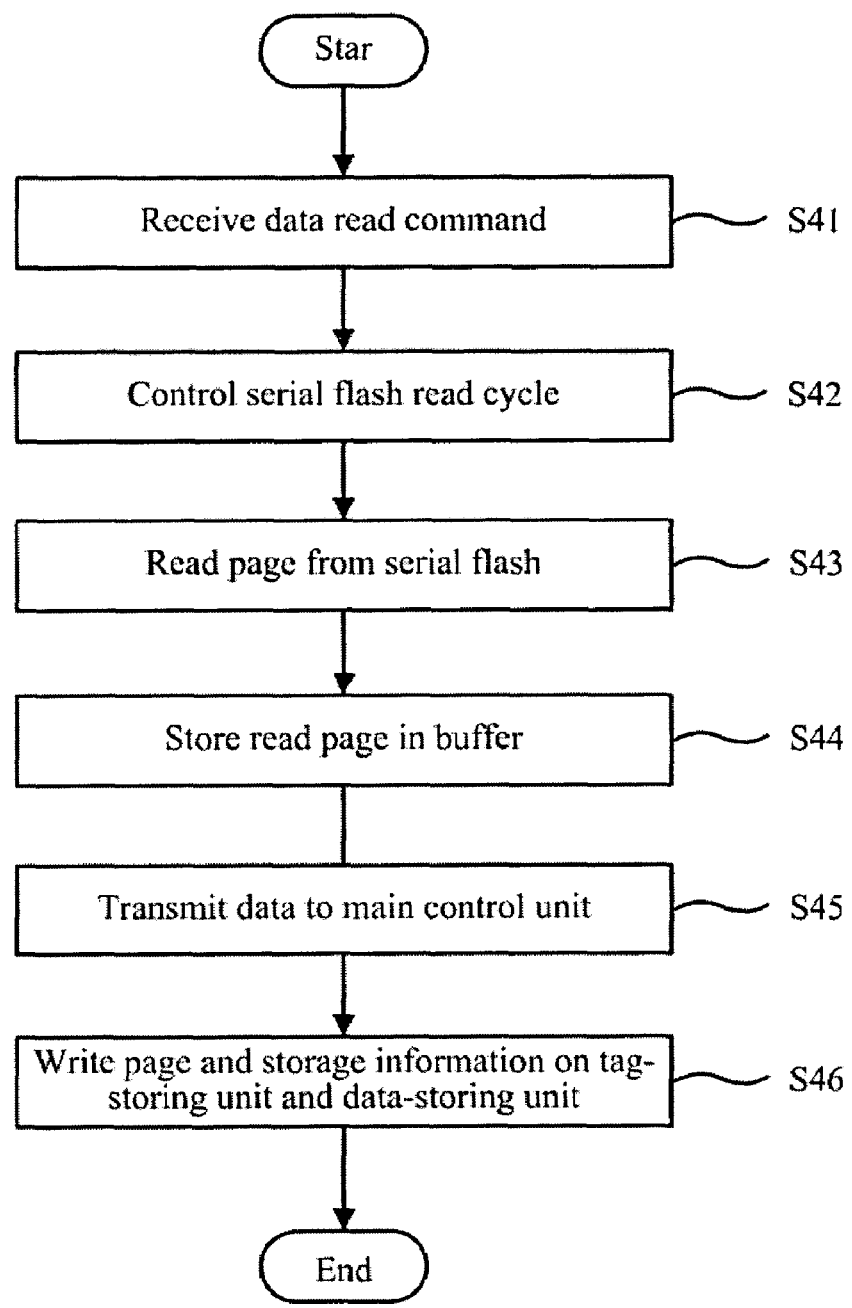
FIG. 9 is an operational flowchart illustrating a processing procedure for a read command received from the main control unit in step S5 of FIG. 5.

FIG. 9 shows a processing procedure for a case where a read command for causing predetermined data written on the serial flash 100 to be read is received from the main control unit 300.

As shown in FIG. 9, if the read command is received from the main control unit 300 (S41), the controller 500 searches for a physical address on which data corresponding to a logic address received together with the read command from the main control unit 300 are written, by referring to the mapping table of the serial flash 100.

Then, the controller performs a serial flash read cycle control process in which it is determined whether a page corresponding to a range of the searched physical address is stored in the data-storing unit 535, by referring to the tag-storing unit 533 of the cache 530 through the searched physical address (S42).

If it is determined through the serial flash read cycle control process that data required to be read by the main control unit 300 are stored in the data-storing unit 535, the relevant data are extracted from the data-storing unit 535 and then transmitted to the main control unit 300. If not, the entire page to which data written at a relevant physical address belong is read by accessing the serial flash 100 (S43).

The cache controller 531 of the cache 530 stores the read page in the buffer (S44), and extracts the data that is required to be read are extracted and transmitted to the main control unit 300 (S45).

Further, the read page and its address information are written on the tag-storing unit 533 and the data-storing unit 535 (S46).

The XIP method in the serial flash 100 according to an embodiment of the present invention performed as described above will be described in detail with reference to the accompanying drawings.

If power is supplied to the system, the controller 500 reads the boot codes for the initial booting from the serial flash 100 and stores them in the buffer. When the boot read command is received while the first code fetch cycle is initiated in the main control unit 300, the controller 500 transmits the boot codes stored in the buffer to the main control unit 300.

The main control unit 300 prepares initialization by an initialization and ROM code jump command included in the initial boot codes.

After the main control unit 300 finishes preparation of the initialization, it accesses the data-storing unit 535 by referring to the tag-storing unit 533 comprising the address map of the serial flash 100 and transmits the data required by the main control unit 300 to the main control unit 300 through a data bus. The main control unit 300 immediately executes the transmitted data to initiate the booting.

If an interface between the main control unit 300 and the serial flash 100 is made through the controller 500 in such a way, the main control unit 300 directly accesses the data written on the serial flash 100 without going through the main memory, so that XIP can be realized.

That is, the controller 500 defines necessary functions such as read/write/erase/program in response to a request from the main control unit 300, and refers to the tag-storing unit 533 and then determines whether an address corresponding to the memory address required to be read by the main control unit 300, which has been stored in the data-storing unit 535, is written.

If it is determined that there is an address corresponding thereto, the relevant data are read from the data-storing unit 535 and transmitted to the main control unit 300. If not, the controller 500 accesses the serial flash 100, reads an entire page to which the relevant data belong, stores them in the buffer, transmits the data at the required address to the main control unit 300, and writes the read page on the tag-storing unit 533 and the data-storing unit 535.

Hereinafter, the aforementioned process will be described in detail with reference to the accompanying drawings.

Figure 10:
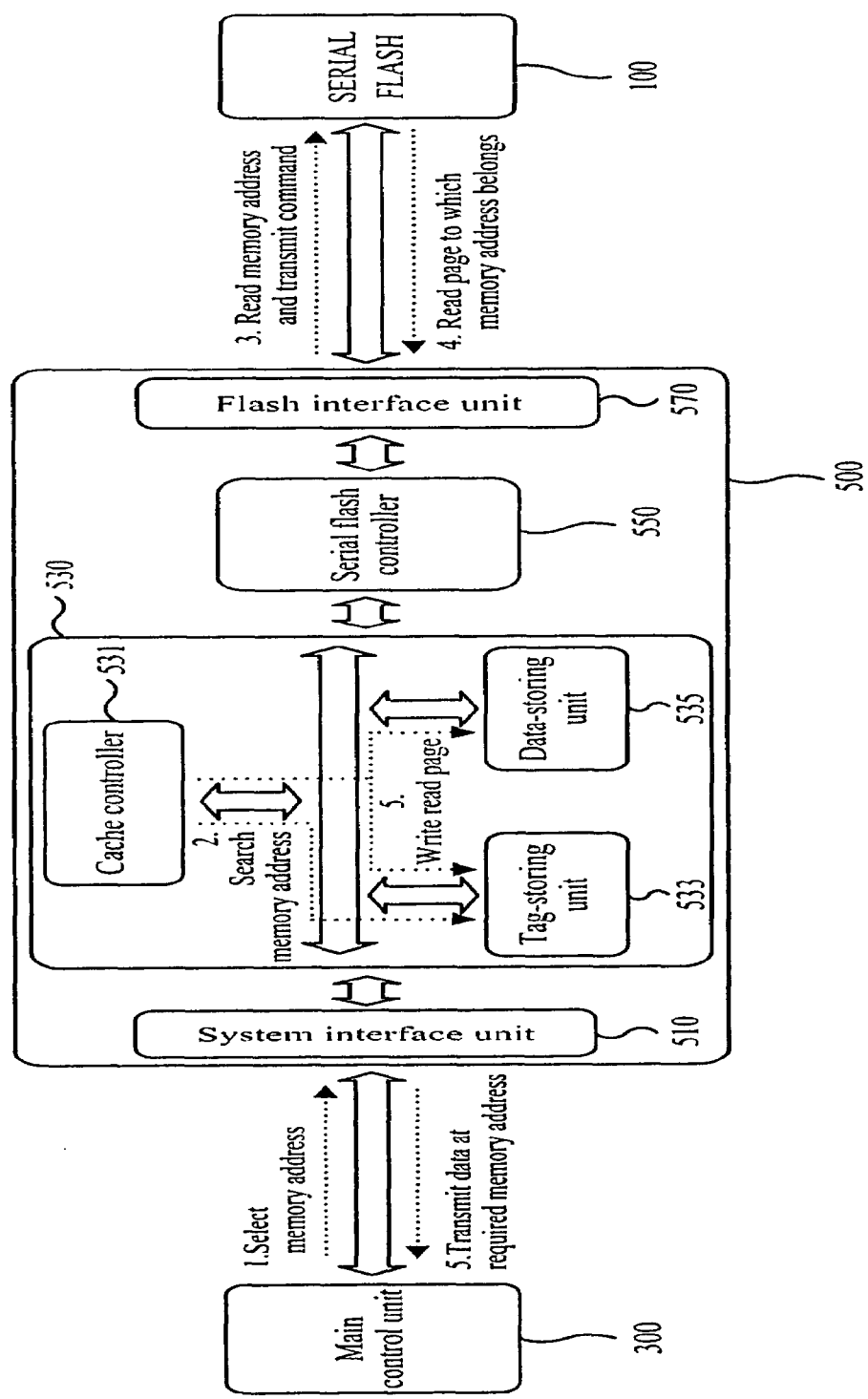
FIG. 10 is an operational flowchart illustrating a processing procedure for a case where data required by the main control unit do not exist in the data-storing unit according to an embodiment of the present invention.

FIG. 10 shows a processing procedure for a case where data required by the main control unit 300 do not exist in the data-storing unit 535.

As shown in FIG. 10, if the read operation is requested by the main control unit 300 together with a selection signal of a specific memory address in the serial flash 100 (1), the controller 500 determines whether a page at an address corresponding to the memory address selected in the tag-storing unit 533 is written on the data-storing unit 535 (2).

In the case of the present embodiment, since the page to which the relevant data belong is not stored in the data-storing unit 535, the controller 500 transmits the read command for the memory address required to be read by the main control unit 300 to the serial flash 100 (3), and reads the entire page to which the relevant memory address belongs (4).

If the page is completely read, the controller 500 stores the read page in the buffer, extracts the required data and transmits the data to the main control unit 300 (5). The read page and its storage information are written on the tag-storing unit 533 and the data-storing unit 535 (6).

Figure 11:
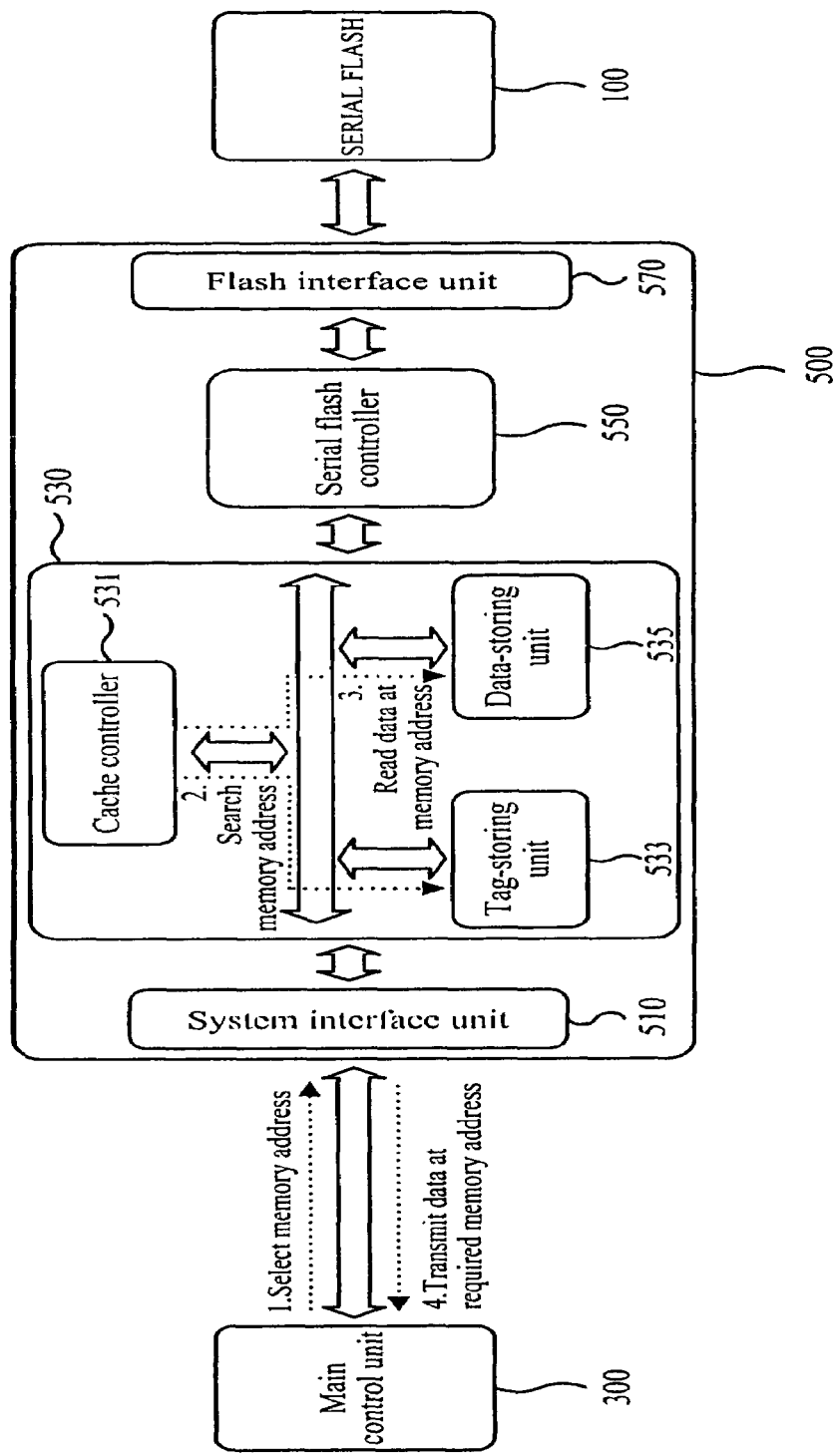
FIG. 11 is an operational flowchart illustrating a processing procedure for a case where the data required by the main control unit exist in the data-storing unit according to the embodiment of the present invention.

FIG. 11 shows a processing procedure for a case where data required by the main control unit 300 exist in the data-storing unit 535 as a result of repeat of the aforementioned processes.

As shown in FIG. 11, if the read operation is requested by the main control unit 300 together with the selection signal of the specific memory address in the serial flash 100 (1), the controller 500 determines whether the page at the address corresponding to the memory address selected in the tag-storing unit 533 is written on the data-storing unit 535 (2).

In the case of the present embodiment, since the page to which the relevant data belong is stored in the data-storing unit 535, the controller 500 extracts the required data from the data-storing unit 535 by referring to the storage information searched through the tag-storing unit 533 (3).

The extracted data are transmitted to the main control unit 300 by the controller 500 (4).

According to the present invention, the XIP function can be supported by the serial flash through the serial flash control apparatus that accesses the serial flash, reads a required page and provides it to the main control unit.

In addition, an auxiliary storage device can be provided at the same or lower cost by substituting the ROM or NOR flash with the serial flash memory chip including the serial flash controller capable of supporting the XIP function.

Although the present invention has been described in connection with the embodiment illustrated in the drawings, the embodiment is merely for illustrative purposes. It will be understood by those skilled in the art that various modifications and other equivalent embodiments can be made thereto.

Therefore, the true technical scope of the invention should be construed as being defined by the appended claims.

What is claimed is:

1. An apparatus for controlling execute-in-place (XIP) in a serial flash, comprising:
   a cache module for accessing a designated memory address of the serial flash in response to a command received from a main control unit through a system interface unit, and reading or writing data required by the main control unit in a read or write operation;
   a serial flash controller comprising a boot loader for allowing system booting to be performed by reading boot codes written on the serial flash, the serial flash controller storing the boot codes in a buffer and immediately transmitting the boot codes to the main control unit when the main control unit requires the boot codes; and
   a flash interface unit for handling transmission and reception of data among the cache module, the serial flash controller and the serial flash,
   wherein the cache module comprises:
      a cache controller that if the read operation is required by the main control unit, accesses the serial flash, reads a page to which the designated memory address belongs, and transmits data in the read page corresponding to the designated memory address to the main control unit;
      a tag-storing unit on which storage information on the read page is written in response to an operation control of the cache controller; and
      a data-storing unit on which the read page is written.

2. The apparatus as claimed in claim 1, wherein the cache controller further includes a function of extracting relevant data from the data-storing unit and transmitting the extracted data to the main control unit if the page including the designated memory address is written on the tag-storing unit, by referring to the tag-storing unit and the data-storing unit upon performing the read operation.

3. The apparatus as claimed in claim 1, wherein the serial flash controller further comprises a prefetch for reading beforehand data expected to be required by the main control unit from the serial flash, storing the data in the buffer and immediately providing the data to the main control unit when the main control unit requires the data.

4. The apparatus as claimed in claim 1, wherein the data-storing unit and the tag-storing unit are SRAM.

5. A flash memory chip having an apparatus for controlling execute-in-place (XIP) in a serial flash, the apparatus comprising:
   a serial-cell type serial flash; and
   a controller for accessing the serial flash, and directly providing boot codes for system booting which are stored beforehand in a buffer, or reading or writing relevant data by accessing a designated memory address, in response to an operation required by a main control unit of a system, wherein the controller comprises:
      a cache module for accessing the designated memory address of the serial flash in response to a command received from the main control unit through a system interface unit, and reading or writing data required by the main control unit;
      a serial flash controller with a boot loader for allowing the system booting to be performed by reading the boot codes written on the serial flash, storing the boot codes in the buffer and immediately transmitting the boot codes to the main control unit when the main control unit requires the boot codes; and
      a flash interface unit for handling transmission and reception of data among the cache module, the serial flash controller and the serial flash,
      wherein the cache module comprises:
         a cache controller that if the read operation is required by the main control unit, accesses the serial flash, reads a page to which the designated memory address belongs, and transmits data in the read page corresponding to the designated memory address to the main control unit;
         a tag-storing unit on which storage information on the read page is written in response to an operation control of the cache controller; and
         a data-storing unit on which the read page is written.

6. A method for controlling execute-in-place (XIP) in a serial flash, comprising:
   accessing the serial flash, reading boot codes for initial booting, and storing the boot codes in a buffer, when power is supplied to a system;
   if the boot codes are completely stored and the boot codes are required by a main control unit of the system, reading the boot codes from the buffer, transmitting them to the main control unit and processing an operation required by the main control unit;
   receiving a data read command together with a memory address for data transmitted in response to a predetermined data read request of the main control unit;
   searching the memory address from a tag-storing unit of the controller in response to the received read command;

if the memory address is found extracting relevant data from a data-storing unit of the controller and transmitting the data from the data-storing unit to the main control unit; and if the memory address is not found, accessing the serial flash, reading a page to which the memory address belongs, storing the page in the buffer, extracting data at the memory address, and transmitting the data at the memory address to the main control unit, wherein the accessing the serial flash, reading the page to which the memory address belongs, storing the page in the buffer, extracting the data at the memory address, and transmitting the data the memory address to the main control unit comprises writing storage information on the read page on the tag-storing unit and writing the read page on the data-storing unit.

7. The method as claimed in claim 6, wherein the step of reading the boot codes and transmitting them comprises:
receiving a boot code read command from the main control unit;
reading the boot codes stored in the buffer in response to the received boot code read command; and
transmitting the read boot codes to the main control unit.

8. The method as claimed in claim 6, further comprising:
receiving a serial flash ID read command transmitted in response to a serial flash ID read request of the main control unit;
accessing the serial flash through the cache module of the controller in response to the received serial flash ID read command; and
reading an entire page to which the serial flash ID required by the main control unit belongs from the serial flash, storing it in the buffer, and sequentially transmitting required data.

9. The method as claimed in claim 6, further comprising:
receiving a data write command together with a memory address for data transmitted in response to a predetermined data write request of the main control unit;
storing the data transmitted from the main control unit in the buffer in response to the received data write command; and
writing the data stored in the buffer on a memory address assigned by a means for mapping the serial flash.

* * * * *